United States Patent

Passmore

[15] 3,636,304
[45] Jan. 18, 1972

[54] APPARATUS FOR METAL VAPORIZATION COMPRISING A HEATER INSERTED INTO A REFRACTORY VESSEL

[72] Inventor: Edmund M. Passmore, Wilmington, Mass.
[73] Assignee: GTE Sylvania Incorporated
[22] Filed: Mar. 10, 1971
[21] Appl. No.: 122,791

[52] U.S. Cl. ............................. 219/271, 118/48, 219/275
[51] Int. Cl. ................................................... C23c 13/02
[58] Field of Search ............... 219/271, 272, 275, 426, 538, 219/544, 553; 118/48, 49, 49.1; 13/25; 21/119; 117/107

[56] References Cited

UNITED STATES PATENTS

| | | | |
|---|---|---|---|
| 2,772,318 | 11/1956 | Holland | 13/25 |
| 3,514,575 | 5/1970 | Hall et al. | 219/275 |
| 3,515,852 | 6/1970 | Matheson et al. | 219/275 |
| 3,541,301 | 11/1970 | Gallet | 219/271 |

Primary Examiner—C. L. Albritton
Attorney—Norman J. O'Malley and James Theodosopoulos

[57] ABSTRACT

An improved evaporation source for vacuum deposition of metals comprises a refractory vessel heated and supported by a separate heater inserted in the vessel. The vessel has a cavity to contain the metal to be evaporated and has a uniform wall thickness beneath the cavity. The heater comprises an electrically conductive refractory material shaped so as to support the vessel only at the ends thereof but to be in efficient heat transfer relationship therewith.

7 Claims, 3 Drawing Figures

PATENTED JAN 18 1972

3,636,304

EDMUND M. PASSMORE
INVENTOR

BY James Theodospulos
ATTORNEY

APPARATUS FOR METAL VAPORIZATION COMPRISING A HEATER INSERTED INTO A REFRACTORY VESSEL

BACKGROUND OF THE INVENTION

1. Field of the Invention

This invention relates to evaporation sources such as are used in vacuum-metallizing apparatus. It particularly concerns such sources which comprise a refractory vessel heated by a separate heater, in contradistinction to vessels which are self-resistance-heated.

2. Description of the Prior Art

Evaporation sources for vacuum-metallizing processes, such as for the continuous deposition of aluminum on, for example, rolls of plastic film, generally comprise a refractory vessel to contain the metal to be evaporated or to which the metal can be fed, for example, from a spool of wire. Such vessels can be either self-resistance-heated or can be heated by a separate heater.

Examples of the former are shown in U.S. Pat. Nos. 2,730,986, 2,866,724, 2,903,544, 2,962,538, 2,984,807, 3,181,968, 3,216,710 and 3,544,486. The vessels disclosed in these patents are electrically conductive and are heated by passing electric current therethrough.

Examples of the latter are shown in U.S. Pat. Nos. 2,772,318, 3,063,856, 3,373,260, 3,514,575 and 3,515,852. In these patents, the vessel and the heater comprise separate bodies, the vessel comprising material that is resistant to the metal to be evaporated and the heater comprising material suitable for electrical heating, induction heating and the like.

As shown in the latter patents, a two-component system, that is, a system comprising a separate vessel and a separate heater, is desirable, since the material for each component can be selected for its optimum properties therefor.

Although known two-component metal-evaporating sources may be satisfactory for many applications, it is an object of this invention to describe an improved metal-evaporating source having advantages not shown by the prior art.

One of the problems of prior art two-component sources results from contact between the vessel and heater at the hottest regions thereof. Since the vessel and the heater generally comprise different materials and since the operating temperature at the region of contact is generally extremely hot, say, about 1400°–2600° C., a reaction can occur between the heater and the vessel at the region of contact which can cause premature failure of the evaporating source.

For example, if the vessel is made of boron nitride and the heater is made of graphite, a reaction can occur between them at the hot points of contact, producing boron carbide. Premature failure can occur from such a reaction because of, inter alia, thermal cracking of either the vessel or the heater.

Similarly, a reaction between a boron nitride vessel and a tungsten heater, at the hot point of contact therebetween, can produce tungsten boride and cause premature failure. Similar reactions can occur between aluminum oxide vessels and graphite heaters or titanium boride containing vessels and tungsten heaters. It can be seen, then, that it would be desirable to avoid all physical contact between vessel and heater at the hot regions thereof, even point contact such as is shown in U.S. Pat. No. 2,772,318.

Another disadvantage of prior art two-component evaporating sources is a nonuniformity in thickness of the cavity portion of the vessel and, specifically, in the thickness of material between the evaporating surface of the cavity and the heater. Nonuniform thickness in this critical region can yield undesirable hot spots in the cavity and can also cause cracking of the vessel, a result of high transverse thermal gradients and nonuniform thermal expansion.

Other disadvantages of said sources include: low thermal efficiency, because of excessive radiation losses in the heater or inefficient heat transfer from the heater to the vessel; undesirable heating of the material (i.e., plastic film) to be coated because of direct exposure thereof to the heater; insufficient protection of the heater from the metal being evaporated; and low evaporation rates in relation to the size of the vessel and heater.

SUMMARY OF THE INVENTION

A metal-evaporating source in accordance with this invention consists of a two-component system, that is, a separate elongated vessel and a separate elongated heater. The vessel is made of refractory material suitably resistant to the metal to be evaporated and has a relatively large but shallow cavity centrally disposed on the upper surface thereof. The purpose of the cavity is to contain said metal, the bottom of the cavity being the surface at which substantially all metal evaporation occurs. Said cavity surface is parallel to the bottom surface of the upper section of the vessel, the reason being to provide substantially uniform material thickness therebetween. Such uniformity overcomes disadvantages mentioned above under "Description of the Prior Art," namely, it eliminates hot spots within the cavity and it eliminates thermal cracking due to nonuniform thickness.

The heater is made of electrically conductive material capable of being resistance-heated to high temperatures. In addition, the heater should have sufficient mechanical strength to be self-supporting and to also support the vessel.

The vessel and the heater are of such configuration that there is no physical contact therebetween at the high-temperature regions thereof, that is to say, in the cavity region of the vessel. However the gap between the vessel and heater at this region is very small for the purpose of efficient transfer of heat from the heater to the vessel.

There is physical contact between the vessel and heater at or near the ends of each, that is to say, beyond the cavity region of the vessel, the vessel being supported by the heater in this manner. Such physical contact occurs at areas that are considerably cooler than the central portions of each and where the likelihood of reaction between heater and vessel is greatly reduced. Shoulders may be provided in either the vessel or the heater at the ends thereof or suitable inserts may be used in order to prevent physical contact between the vessel and the heater at the central portions thereof.

The vessel surrounds the heater on all four longitudinal sides, that is to say, on the upper and lower surfaces and both longitudinally extending vertical surfaces, for the purpose of efficient heat transfer from the heater to the vessel and also to reduce radiation losses from the heater. Depending on the operating temperature and the likelihood of reaction between vessel and heater, there may or may not be physical contact between the heater and the lower section of the vessel and/or said vertical surfaces. However, contact therebetween can be avoided by suitable shoulders or inserts which permit physical contact only at the ends.

In order to improve thermal efficiency and to prevent exposure of the material to be coated, e.g., plastic film, to direct radiation from the heater, the heater should extend beyond the ends of the vessel only enough to be supported or clamped in electrical binding posts of a suitable vacuum apparatus.

Since the vessel almost completely shields the heater from the metal to be evaporated, even in situations where the cavity becomes filled with liquid metal because of improper operation and the metal overflows, there is little likelihood of corrosion of the heater by the metal. However, in some cases, liquid metal, especially aluminum, can creep along the surface of an evaporating vessel. Thus it may be desirable to provide suitable grooves in the vessel in order to reduce the possibility of metal flowing to the end of the vessel where it could contact the heater.

In a patent application entitled "Apparatus for Metal Vaporization Comprising a Heater and a Refractory Vessel," filed on even date herewith by the same inventor and assigned to the same assignee, an elongated vessel is disclosed which surrounds an elongated heater on only three longitudinal sides. Although the apparatus disclosed herein is thermally more efficient than that in said application, a vessel constructed according to the said application is simpler and less expensive to fabricate.

DESCRIPTION OF THE PREFERRED EMBODIMENTS

Figure 1:
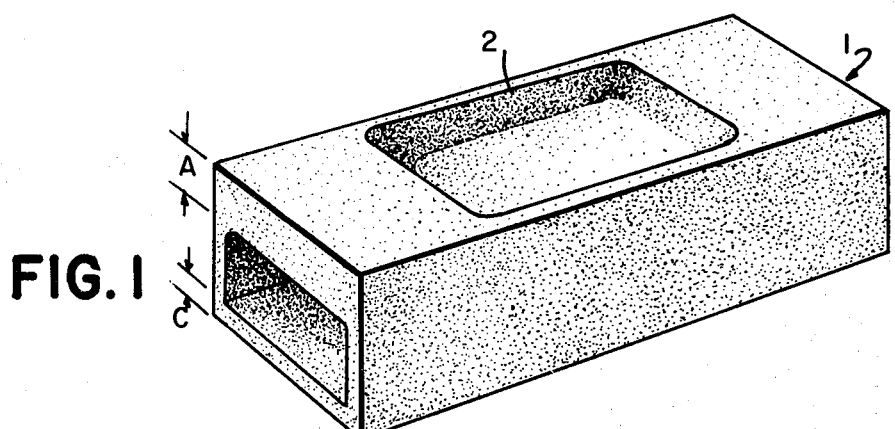
FIGS. 1 and 2 are perspective views of evaporating vessels in accordance with this invention.
Figure 2:
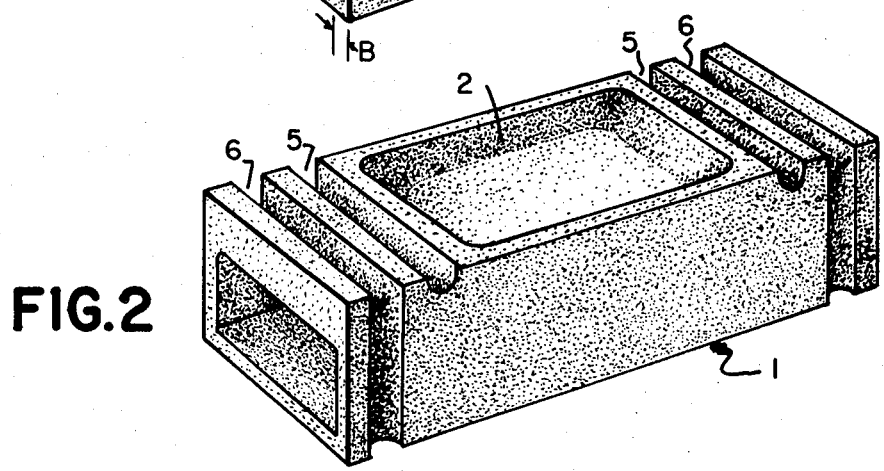

An evaporating vessel 1, as shown in FIGS. 1 and 2, is elongated in shape and is made of refractory material suitably resistant to a predetermined evaporatable metal. Centrally disposed on the upper surface of vessel 1 is cavity 2, substantially uniform in shape. Cavity 2 is relatively large in relation to vessel 1 in order to provide a large evaporation surface and, therefore, a high evaporation rate for a given cavity surface temperature. Thus, the width of cavity 2 could be as high as 90 or 95 percent of the width of vessel 1, the remaining wall thickness being only sufficient to be structurally sound.

The length of cavity 2 can be three-fourths, or even greater, of the length of vessel 1, dependent on the strength of the material comprising vessel 1. However, at cavity lengths greater than about three-fourths, there can be an excessive temperature variation along the length of cavity 2, the ends thereof being cooler than the center. Thus, if cavity 2 is too long in relation to vessel 1, the ends of cavity 2, in some cases, may not be at a sufficiently high temperature to evaporate metal therefrom. Also, the length of cavity 2 should not be so long that the ends of vessel 1, where said vessel is supported, operate at an undesirably high temperature, that is to say, at a temperature at which substantial reaction occurs between vessel 1 and heater 3.

In evaporation apparatus where metal, e.g., aluminum, is continuously fed to cavity 2 from a spool of wire within a vacuum chamber, relatively large cavity 2 offers additional advantages. It can accommodate the end of the wire as the wire is unreeled from the spool and directed into cavity 2, said end tending to wander throughout the process. And it dampens to the extent of providing a uniform evaporation rate, the somewhat erratic unreeling of the wire spool, erratic because of the mechanical drives employed in the unreeling operation.

The material thickness at the bottom of cavity 2 is substantially uniform throughout, for reasons mentioned above. However, for highest cavity temperatures with minimum radiation losses from the upper surface of vessel 1, said thickness should be between about one-third and two-thirds of the thickness of the upper section of vessel 1, that is to say, of section A, the upper and lower surfaces of section A, in addition to the bottom of cavity 2, being substantially parallel to each other.

Figure 3:
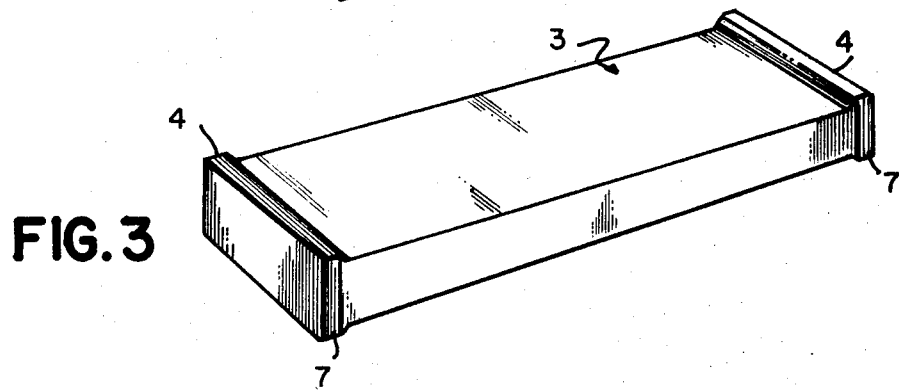
FIG. 3 is a perspective view of a heater than can be used with the vessels of FIGS. 1 and 2.

Vessel 1 is a substantially rectangular solid, having a rectangular opening extending longitudinally therethrough. The opening is bounded by upper section A, vertical sections B and lower section C of vessel 1 and is of such a size as to provide only slight clearance when heater 3, shown in FIG. 3, is inserted therein.

Heater 3 is elongated in shape and is made of electrically conductive refractory material capable of being resistively heated to temperatures necessary for metal evaporation. The upper surface of heater 3 is substantially flat, corresponding to the lower surface of section A of vessel 1, except for two shoulders 4 at the ends thereof. As previously mentioned, the purpose of shoulders 4 is to support vessel 1 at the ends thereof, there being no physical contact between the lower surface of section A and the upper surface of heater 3 between shoulders 4. The height of shoulders 4 should be only high enough to prevent physical contact between said two surfaces, since excessive height would reduce efficiency of heat transfer therebetween. In a typical example the height of shoulders 4 is between 10 and 100 mils.

The ends of heater 3 should extend beyond the corresponding ends of vessel 1 in order to provide for suitable connection thereof to electrical binding posts in a vacuum chamber. When the ends of heater 3 are clamped in the posts, they must extend beyond vessel 1 to a greater extent than when an axial compressive connection is employed. In the evaporating source shown in the drawing, heater 3 is only slightly longer than evaporating vessel 1 because it is designed for the latter type of connection.

In one embodiment of an evaporating source in accordance with this invention, vessel 1 was made of boron nitride and was 2⅜ inches long by 1¼ inches wide by eleven-sixteenths inch high. Cavity 2 was 1¼ inches long by 1 inch wide by one-eighth inch deep. The thickness of section A was seven thirty-seconds inch and the thickness of sections B and C was three thirty-seconds inch. The rectangular opening was machined in vessel 1.

Heater 3 was made of graphite and was 2½ inches long by seven-eighths inch wide by five-sixteenths inch high. At each end of heater 3 was shoulder 4 extending across the full width of heater 3 and in from each end for one-eighth inch. The height of each shoulder was 20 mils.

In operation, heater 3, inserted through and supporting vessel 1, was supported in an evaporating chamber between axial compressive electrical posts, the ends of vessel 1 resting on shoulders 4. At a vacuum of $3 \times 10^{-5}$ Torr, electric current was passed through heater 3. At operating conditions of 5.4 volts and 625 amperes, the heater temperature was 2100°–2300° C. and the cavity temperature was 1500°–1600° C.. Aluminum in the form of 57-mil wire from a spool within the chamber was fed and evaporated from the cavity at a rate of 1.4 grams per minute.

In another embodiment, shown in FIG. 2, vessel 1 had two transverse grooves 5 and 6 at each end thereof. Grooves 5 were closer to cavity 2 and extended only across the upper surface of vessel 1 while grooves 6 also extended down both vertical surfaces. Grooves 5 and 6 were one-eighth inch wide by one-eighth inch deep. As previously mentioned, the grooves aid in preventing aluminum creeping to the ends of vessel 1.

Although shoulders 4 are shown as part of heater 3, the desired spacing between vessel 1 and heater 3 may be obtained by having the upper surface of heater 3 flat and placing corresponding shoulders at the ends of vessel 1, on the lower surface of section A. Or, if desired, both surfaces may be flat and suitable spacers or inserts, made, for example, from 60-mil-thick graphite, may be used to obtain said spacing.

Also, similar shoulders 7, either on heater 3 or vessel 1, or other spacers, may be used to prevent contact between the sides of heater 3 and the inner surfaces of sections A, except at the ends thereof.

It is usually not necessary to make provision for spacing between the bottom surface of heater 3 and the upper surface of section C, because the necessary clearance in heater 3 which permits insertion into vessel 1 plus the fact that vessel 1 rests on shoulders 4, usually results in no contact between heater 3 and section C. However, spacers may be provided therebetween, if desired.

For evaporating aluminum, boron nitride is especially suitable as the vessel material because of its machinability and resistance to aluminum. However, other compositions may be used, either for evaporating aluminum or other metals, such as refractory carbides, borides, nitrides or oxides, for example, tantalum carbide, or mixtures thereof. The composition should be of a type that can be machined, pressed and/or molded into the final desired shape.

A composite vessel consisting of 30 percent titanium diboride, 30 percent boron nitride, 36 percent aluminum nitride and b 44 percent boric oxide (percent by weight) was found to be superior to boron nitride for evaporating aluminum, attaining an evaporation rate of 6.0 grams per minute without harmful result. A corresponding boron nitride vessel cracked after a short period of operation at the same evaporation rate.

Graphite is suitable for the heater because of its electrical conductivity, machinability and high emissivity, which improves thermal efficiency. However, other suitable electrically conductive refractory compositions may also be used, such as those containing titanium diboride, an example of which is shown in U.S. Pat. No. 3,544,486. The composition should be of a type that can be machined, pressed and/or molded into the final desired shape.

Examples of electrically conductive materials that can be incorporated in composite heaters are titanium carbide, molybdenum carbide, zirconium carbide, tantalum carbide, titanium diboride and zirconium diboride. Also, a tungsten mesh element, fabricated according to the intertwisting process disclosed in U.S. Pat. No. 3,178,665 but in rectangular form with a substantially planar upper surface, operated successfully as a heater in accordance with this invention. U-shaped tungsten sheet metal elements were inserted over the ends of the heater, and welded thereto, to provide spacing between vessel and heater.

I claim:

1. An evaporation source for the vapor deposition of metals comprising: an elongated refractory vessel having an upper section having an upper surface and a lower surface and having a cavity centrally disposed on said upper surface, the wall thickness beneath said cavity being uniform for substantially the entire area of the cavity; and an elongated substantially rectangular electrically conductive heater, longer than said vessel, having an upper surface and a lower surface and supporting said vessel only at the ends thereof and protruding beyond the ends of said vessel, the upper surface of said heater, between its ends, being proximately spaced from, but parallel to, said lower surface of said upper section, said vessel surrounding said heater on all four longitudinal sides.

2. The source of claim 1 wherein the parallel spacing between the upper surface of said heater and the lower surface of said wall thickness is provided by shoulders at the ends of said heater, said shoulders being integral parts of said heater.

3. The source of claim 2 wherein the height of said shoulders is about 10 to 100 mils.

4. The source of claim 1 wherein the depth of said cavity is from one-half to double said wall thickness.

5. The source of claim 1 wherein the length of said cavity is less than about three-quarter of the length of said vessel.

6. The source of claim 1 wherein said heater physically contacts said vessel only at the ends thereof.

7. The source of claim 1 wherein said heater is made of graphite.

* * * * *